H. W. EISENHART.
THRESHING OR SEPARATING MACHINE.
APPLICATION FILED MAR. 31, 1909.
930,166.
Patented Aug. 3, 1909.
6 SHEETS—SHEET 1.
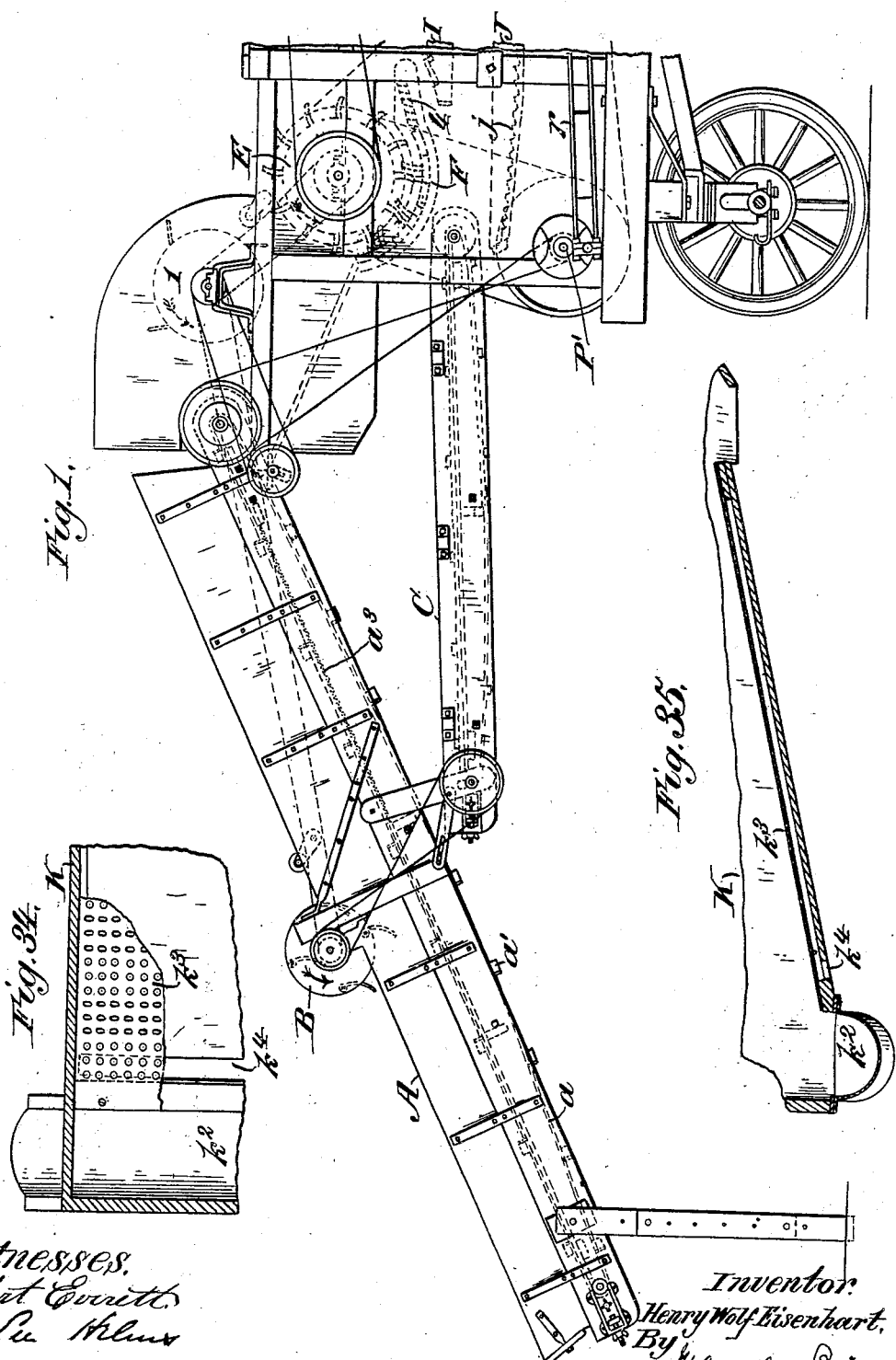

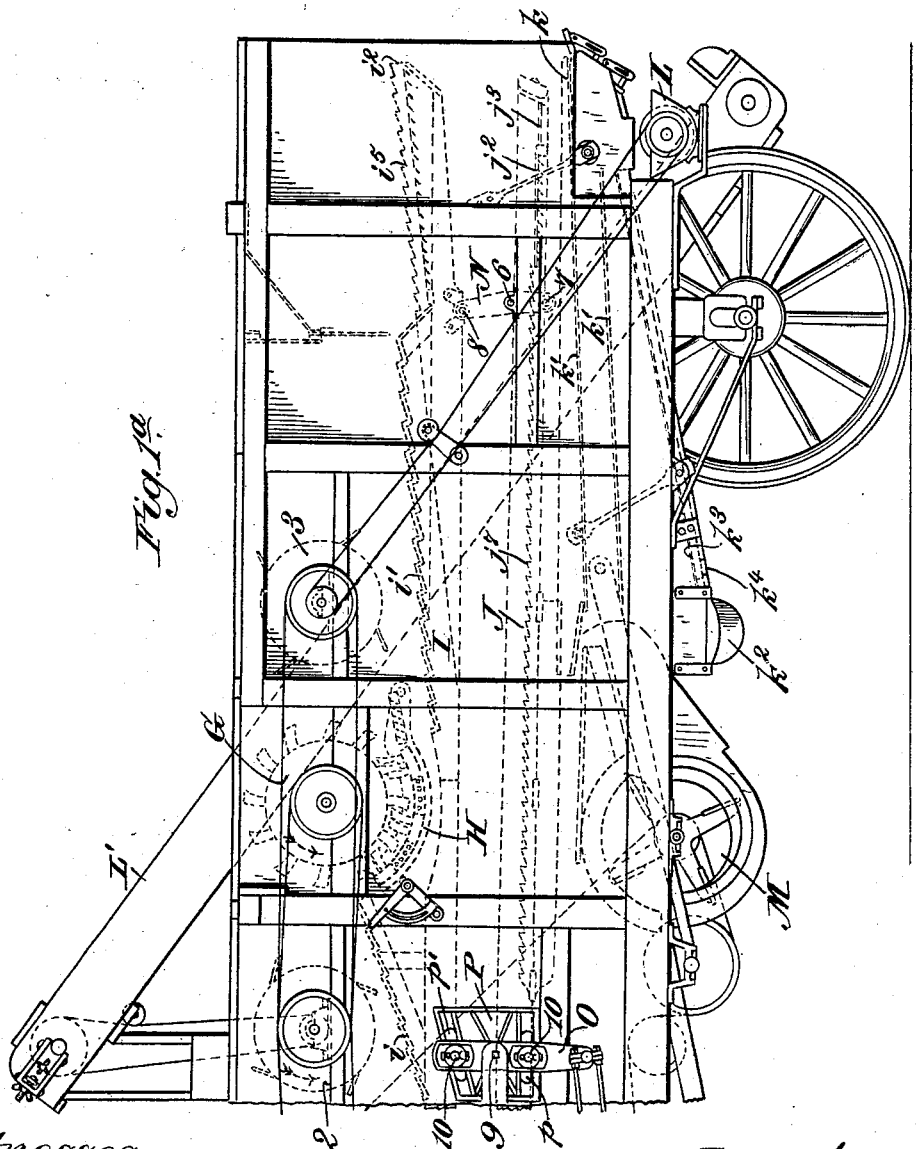

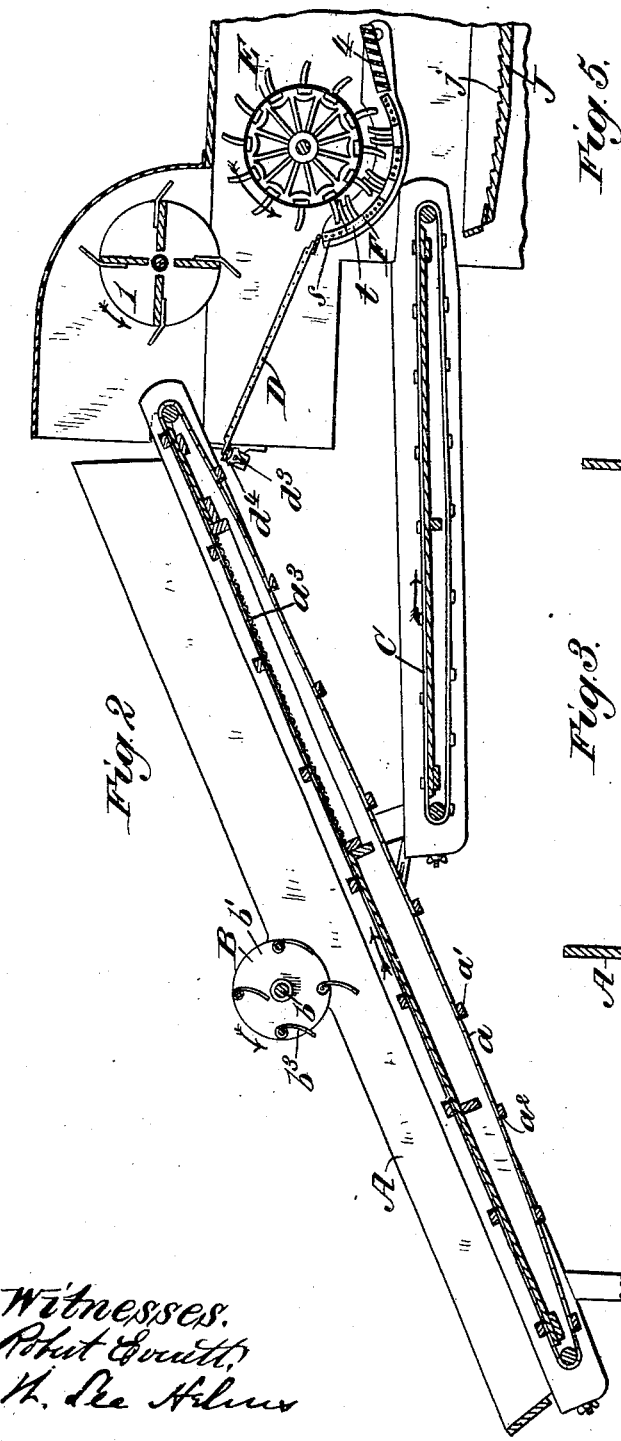

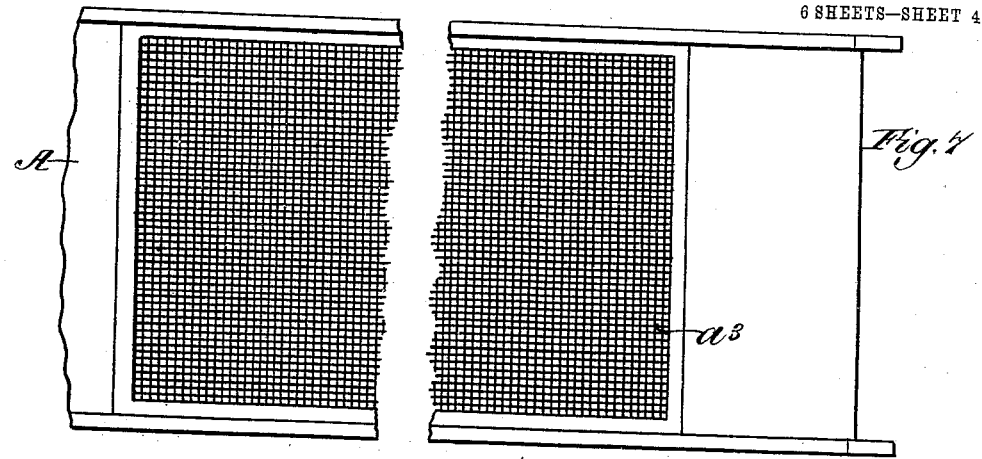
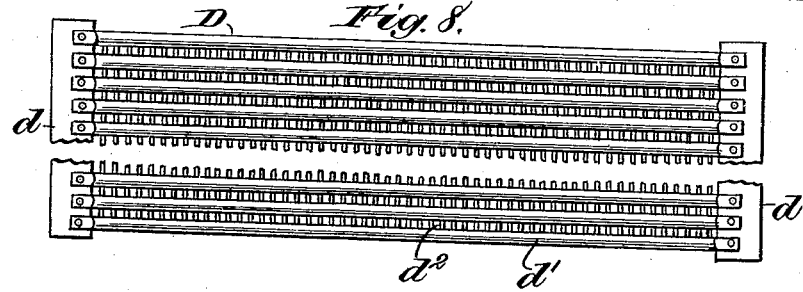
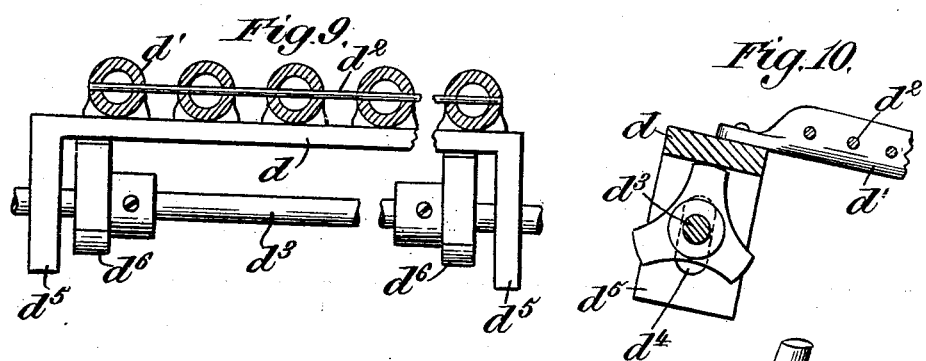
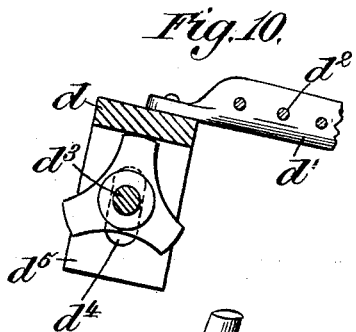
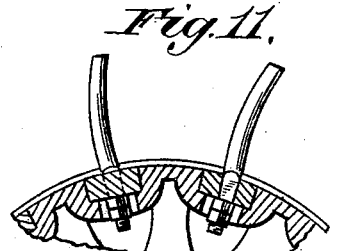
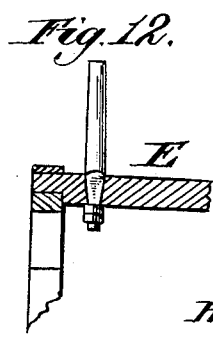
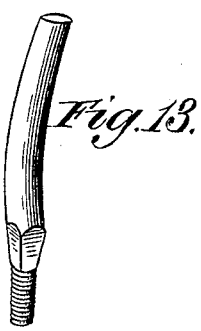

H. W. EISENHART.
THRESHING OR SEPARATING MACHINE.
APPLICATION FILED MAR. 31, 1909.
930,166.
Patented Aug. 3, 1909.
6 SHEETS—SHEET 5.
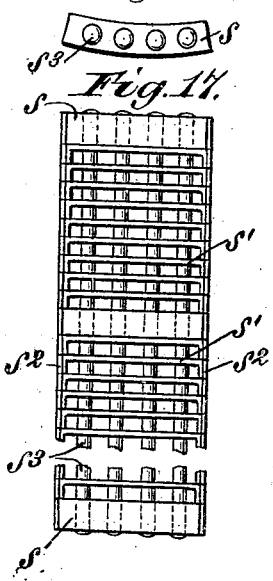
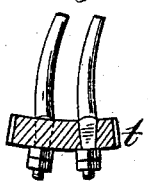
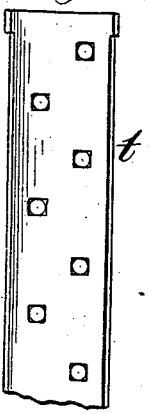
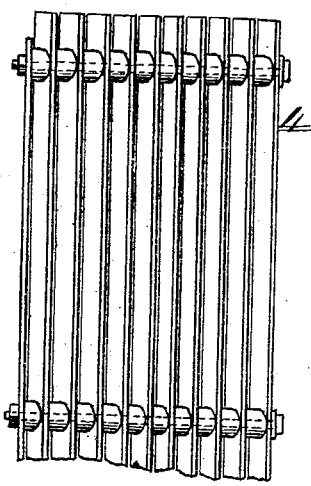
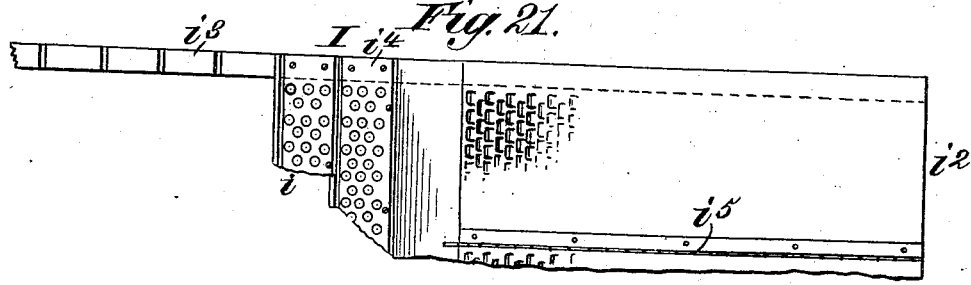
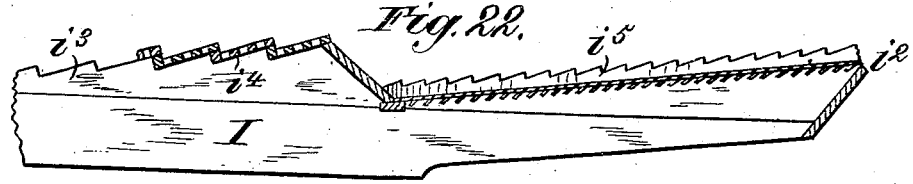
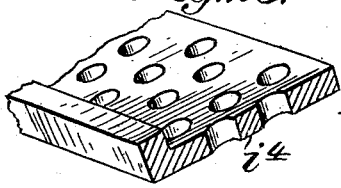
Witnesses.
Inventor.
Henry Wolf Eisenhart.
By
Atty.

H. W. EISENHART.
THRESHING OR SEPARATING MACHINE.
APPLICATION FILED MAR. 31, 1909.
930,166.
Patented Aug. 3, 1909.
6 SHEETS—SHEET 6.
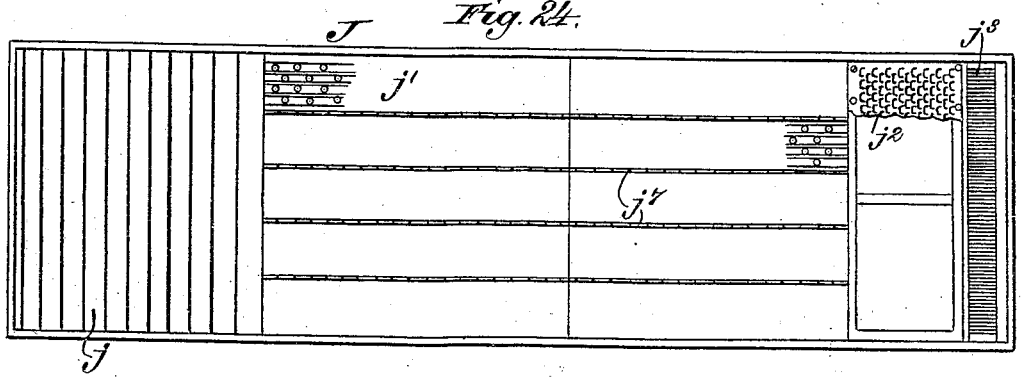
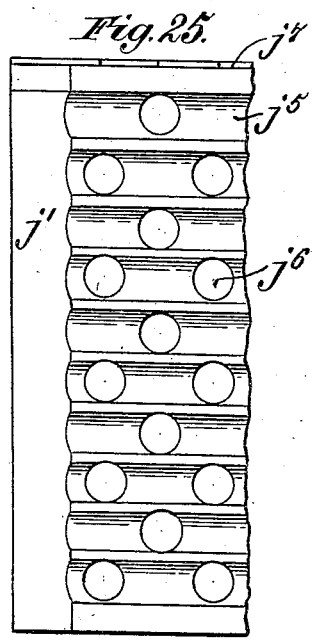
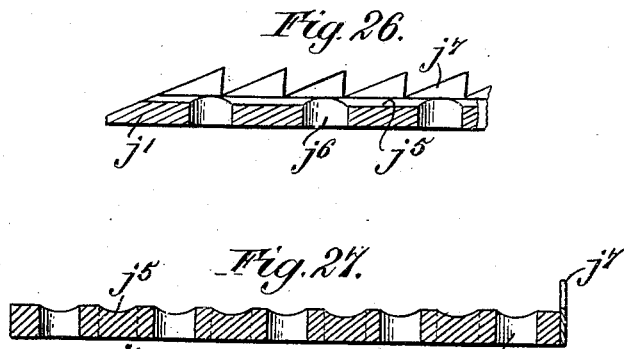
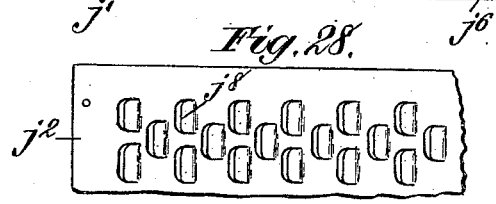
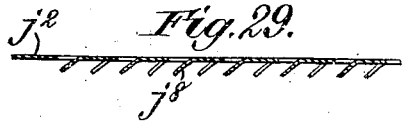
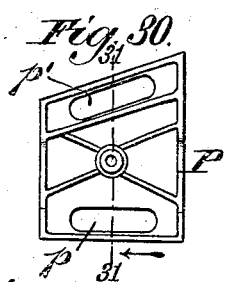
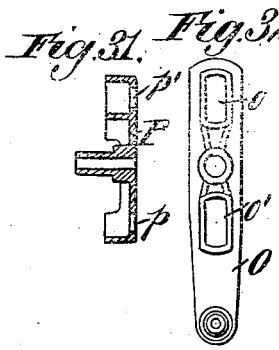
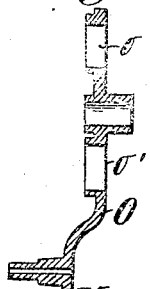
Witnesses.
Robert Everitt,
H. Lee Nelius
Inventor.
Henry Wolf Eisenhart.
By Hamilton Bailey
Atty.

UNITED STATES PATENT OFFICE.

HENRY WOLF EISENHART, OF YORK, PENNSYLVANIA, ASSIGNOR TO A. B. FARQUHAR COMPANY, LIMITED, OF YORK, PENNSYLVANIA.

THRESHING OR SEPARATING MACHINE.

No. 930,166.　　　　Specification of Letters Patent.　　　Patented Aug. 3, 1909.

Application filed March 31, 1909. Serial No. 486,902.

*To all whom it may concern:*

Be it known that I, HENRY WOLF EISENHART, a citizen of the United States, residing at York, county of York, and State of Pennsylvania, have invented certain new and useful Improvements in Threshing and Separating Machines, of which the following is a specification.

These improvements have been designed principally for use in machines for threshing and separating garbanza beans. The garbanza bean is grown principally if not entirely in Mexico. The crop is harvested with a mower and is passed, vines and all, through the threshing and separating machine. The beans grow one in a pod, and when harvested are of all degrees of maturity, from ripe to green. The beans, particularly those which are matured, are comparatively fragile, and inasmuch as their market value is seriously impaired if not wholly destroyed when they are cracked or broken, great care must be exercised in the threshing and separating operation.

In the machine which I have devised for the purpose, the working parts are so organized, and their action upon the charge under treatment is so modified, as to reduce the loss on this account to a minimum, while at the same time at every suitable point in the machine from where the vines first enter the machine, provision is made whereby the beans, as soon as they are hulled and separated, are carried off out of the path of the cylinders and beaters by which the active work of threshing is performed. It is these features which mainly characterize my improvements.

In the accompanying drawings—Figures 1, 1ª is a side elevation of a complete machine embodying my improvements in their preferred form. In these figures the different interior working parts are represented in dotted lines. And the belting (which in practice is of the sprocket kind) for driving the parts, is represented in full and dotted lines. The engine from which power is taken is, in practice, belted to the first cylinder, and from that cylinder, power is carried to the other moving parts of the machine by the sprocket belting, as will be understood without further explanation. The remaining figures are on a larger scale and represent the structural details of the several material members or elements of the machine. Fig. 2 is a longitudinal vertical section of the carrier by which the vines are conveyed to the threshing instrumentalities, together with the parts more immediately associated therewith. Fig. 3 is a cross sectional view of the carrier trough and one of the slats of the carrior apron therein. Fig. 4 is a cross section on still more enlarged scale of a slat, showing the leather strip or wiper attached to the same in position to sweep over the floor of the carrier trough as the slat moves forward. Fig. 5 is a cross section, and Fig. 6 is a vertical axial section, of the revolving whipper-beater and feeder which is mounted on the carrier trough and acts on the charge therein both as a feeder and as a separator. Fig. 7 is a plan view of the upper portion of the carrier trough showing the screen in its bottom or floor for the escape of the beans which have been hulled and separated out by the action of the whipper-beater and feeder. Fig. 8 is a plan of the shaking screen chute, which conducts the vines etc. from the carrier to the first cylinder and concave. Figs. 9 and 10 are sectional views on still more enlarged scale showing the construction of this screen and the knocker shaft by which the screen is given vibrating movement in a vertical plane. Figs. 11, 12 and 13, 14 and 15 are detail views showing the construction and arrangement of the teeth or spikes of the first cylinder and concave. Figs. 16, 17 and 18 are detail views illustrative of the construction of the grate sections which are interposed between and alternate with the toothed sections in both the first and second concaves. Figs 19, 20, are detail views showing construction of the grids by which the material which passes from either concave is directed to the upper shaker. Figs. 21, 22, 23, are detail views of structural features of the upper shaker. Figs. 24, 25, 26, 27, 28, 29 are views of structural details of the lower shaker. Figs. 30, 31, 32, 33 are views of structural details of portions of the mechanism through the intermediary of which fore and aft vibratory movement is imparted to the two shakers. Figs. 34 and 35, are views of the structural details of the sand screen located in the bottom of the shaking shoe.

The general organization is represented in Figs. 1, 1ª.

Referring to these figures—A is the carrier.

B is the power driven whipper-beater and feeder mounted thereon.

C is a power driven endless apron located below the carrier in position to catch beans etc. which may drop through the screen in the upper part of the bottom of the carrier, and to convey them direct to the lower shaker, thus forming a "by-pass" to that shaker, around the beaters and the cylinders, for such beans as may have been separated out by the action of the whipper-beater B.

D is the shaking screen-chute which conducts the material that passes over the carrier to the first cylinder.

1, is a revolving beater with fixed prongs to assist in delivering the material to the first cylinder and to prevent clogging of the machine.

E is the first cylinder and F is the concave therefor.

G is the second cylinder, and H is the concave therefor.

Between the first and second cylinders is a pronged beater 2, whose function is practically the same as that of beater 1, and beyond the second cylinder is a pronged beater 3, whose principal function is to prevent the hulled beans which may pass beyond the second cylinder from flying out at the rear end of the machine. It also serves to hull out any stray unhulled pods if there be any.

I is the upper shaker.

J is the lower shaker.

K is the shaking shoe containing the usual riddles.

L, L' are the tailings elevator and spout.

M is the fan.

The direction of movement of the carrier and other aprons, and of revolution of the various beaters and cylinders is indicated by the arrows.

The machine in its general organization and mode of operation so far as concerns the beaters, cylinders and upper and lower shakers is not unlike the machine of my Patent No. 813,957 of February 27, 1906— the material from the carrier passing successively the first beater 1, the first cylinder and concave E, F, the second beater 2 and the second cylinder and concave G, H, the heavier and more bulky trash passing over the tail of the upper shaker I out from the rear end of the machine, and the separated out grains passing through the upper and lower shakers I, J, successively into the shaking shoe K, and discharging from the spout thereof.

In my present machine the tailings pass through the rear end of the lower shaker J into the tailings spout L whence they are returned by suitable well known conveying mechanism, back to the machine which they enter at a point just in advance of the first beater 1.

Wherein my present machine, aside from structural details of certain members hereinafter specified, differs from the machine of my patent, is in the subjecting of the vines while traveling along in the carrier to the action of a whipper beater for hulling out such of the beans as will yield to this treatment prior to their entrance into the machine; and in the provisions whereby the beans, as soon as they are hulled, are separated and carried off out of the path of the threshing instrumentalities—these provisions consisting mainly of the by-pass hereinbefore referred to around the beaters and cylinders and concaves in the body of the machine, for the beans separated out by the action of the whipper-beater B upon the vines in carrier A; and of grate sections alternating with spiked or toothed sections in each concave, whereby the beans just as soon as hulled may drop through the grate sections of the concave and escape any further action by the cylinder. It may be said here that in the condition in which the bean crop is usually harvested, the whipper-beater B acts to hull out a large percentage of the beans before the vines enter the body of the machine.

The structural details of the carrier are illustrated in Figs. 2, 3, 4, 7. It consists of an upwardly inclined trough over the flat bottom floor of which moves a slat apron consisting of endless belts $a$ of the sprocket kind, connected by cross slats $a'$, provided with downwardly hanging flexible strips $a^2$ of leather or other yielding material, which sweep over the floor of the carrier trough as the slat apron moves along. The slats $a'$ feed the material along—in this action being assisted by the whipper-beater B. The leather flaps or strips $a^2$ are provided for the purpose of making yielding contact with such beans as may be separated out, carrying them along without breaking or cracking them. In the floor of the carrier trough at a point beyond where the whipper-beater B is located, is a screen section $a^3$ (Figs. 2 and 7) having holes of suitable size to permit hulled beans to pass through them. The beans hulled out by the action of the whipper-beater B, and carried along by the slat apron, will, when they reach the screen section $a^2$, pass down therethrough and drop upon the endless carrier apron C, the rear end of which overhangs the front end of the lower shaker J, as illustrated in Fig. 2.

The whipper-beater B is mounted on the carrier trough a suitable distance above the slat apron therein. It consists (Figs. 5 and 6) of a shaft $b$ on which are fixed circular heads $b'$ between which extend four rods $b^2$, on which are hung loosely swinging metal arms or plates $b^3$ which on each rod are separated and spaced apart from one another by interposed pipe washers $b^4$. These swinging arms act as whippers upon the vines and serve effectively as separators, but their pivoted yielding arrangement prevents them from exercising such hard action thereon as to injure the beans.

The screen chute D over which the material under treatment passes from the carrier to the first cylinder and concave and which inclines downward from the carrier to the concave, is a vertically shaking screen, having holes of a size to admit the passage of hulled beans, and arranged over the apron C so that beans which pass through it may be caught by the apron. In the present instance, as seen in Figs. 8, 9, 10, this screen chute D consists of front and rear cross bars $d$ to which are secured the ends of pipes or tubes $d'$ which extend lengthwise of the screen and parallel with each other. They are intersected by cross wires or rods $d^2$ parallel with one another, passing through and crosswise of the longitudinal pipe members $d'$, and spaced at suitable intervals apart from one another to form in conjunction with the longitudinal members $d'$, screen apertures or holes of proper dimensions. The pipes $d'$ are of greater diameter than the cross wires $d$, the intervals between these forming flutes (as hereinafter described with reference to the shakers) which will receive the beans and direct them to the holes in the screen. The rear end of this screen overlaps and rests upon the front end of the first concave F. Its front end is mounted upon and supported by the knocker shaft $d^3$, which enters vertical slots $d^4$ in the downwardly extending ends $d^5$ of the front cross bar $d$, and is provided with a suitable number of knockers $d^6$, which are fixed to and revolve with it and serve to give a vertical shaking movement to the screen, for the purpose of facilitating the separation of the hulled beans from the vines passing over it.

The first cylinder E (Figs. 1, 11, 12, 13) is of ordinary or usual construction save that its teeth or spikes, instead of having the usual flat shape, are cylindrical in cross section and slightly tapering from base to point, as seen in Figs. 11, 12, 13. The teeth of the coöperating concave F are of similar shape, as shown in Figs 14, 15—the object of this construction being to modify and render less harsh the action of the cylinder and concave upon the charge, so as to keep the beans from harm as far as possible. The most vigorous treatment of the charge is reserved for the second cylinder and concave G, H, which are armed with the usual flat teeth or spikes, as indicated in Fig. 1$^a$. The two concaves F, H, are composed each of toothed sections alternating with screen sections. They are constructed alike, with the exception of the shape of the teeth or spikes, so that a description of one will answer for both. The first concave F is shown as composed of three screen sections $s$ and three tooth sections $t$ (Fig. 1), while the second concave H is shown as composed of two screen sections $s$ and three tooth sections $t$; but this difference is immaterial. There may be as many sections in each concave as necessary or desirable.

The structural details of the tooth and screen sections are illustrated in Figs. 14, 15, 16, 17, 18. The tooth section (Figs. 14, 15) consists of a concave base plate $t$ in which suitable teeth are fixed in the usual way. The screen section (which may have any suitable screen provision) is preferaby made up of end cross bars $s$, cross plates $s'$ and longitudinal rods $s^3$, on which the cross plates are strung and supported. Each cross plate $s'$, as seen in Fig. 18, has a longitudinal edgewise curvature to conform to the curve of the concave, and has its ends turned at right angles to its body to form ears $s^2$. The plates are fitted together in edgewise position and so that the ears $s^2$ of the one will meet the body of the other, said ears thus serving to properly space the bars $s'$ apart from one another. Crosswise of the plates $s'$ and parallel with one another, extend rods $s^3$, which pass through holes $s^4$ formed the proper distance apart from one another in the plates $s'$, and are securely attached at their ends to the frame bars $s$. The plates $s'$ and the rods $s^3$ form the screen surface. The alternate screen sections and tooth sections may be mounted in a supporting frame in the same manner as the sections of an ordinary toothed concave; and the concave may be combined with means for adjusting it as a whole relatively to its cylinder, as is the case with ordinary concaves. Just beyond each concave is a grid 4 (Figs. 1, 1$^a$) over which the material passes from the concave to the upper shaker I. This grid is shown on enlarged scale in end view Fig. 19 and in plan Fig. 20. Its construction will be readily understood without description. The upper shaker I extends from the first cylinder and concave E F to the rear end of the machine. It has two screen surfaces $i$, $i'$ (Fig. 1, 1$^a$) which are transversely stepped, as shown, in a direction to convey the vines toward the rear of the machine. One of these stepped screens, viz: screen $i$, is between the two cylinders E, G, and is intended to separate out the hulled beans and prevent them from passing to the second cylinder. The other stepped screen $i'$ is at the rear of the second cylinder, and is designed to separate out such hulled beans as pass beyond the second concave, and to prevent them from passing over the tail $i^2$ of the shaker along with the heavier and more bulky trash.

The preferred construction of the screens $i$, $i'$, is represented in Figs. 21, 22, 23. The particular screen represented in these figures is a portion of screen $i'$; but as the construction is the same in the two screens a description of one will answer for both. The screen is composed of stepped side boards $i^3$ secured to the sides of the frame of the shaker I, with perforated wooden lifts $i^4$ extending between and secured to said side boards as clearly represented in the figures referred to—the perforations being of a suitable size to permit the free passage of the hulled beans. The tail portion $i^2$ of the shaker is also represented in Figs. 21 and 22. It is a "lip riddle" so called, that is to say a riddle formed from sheet metal by making in the sheet metal, at proper intervals apart, half round or half oblong cuts, and then depressing the metal lips thus formed. The construction is like that represented more clearly in Figs. 28, 29. The holes thus formed are large enough to permit the passage of unthreshed pods. The riddle has secured to its face a suitable number of metallic strips which are set on edge and extend longitudinally of this portion of the shaker, and have in their exposed edges serrations or teeth which point in a direction to urge the vines to the rear of the machine. One of these serrated metallic strips is shown at $i^5$ in Figs. 21, 22.

The lower shaker J, which catches all that drops through the upper shaker I, extends practically the whole length of the machine, its front end extending under the rear end of the by-pass apron C, and its rear end overhanging tailings spout L. Its construction is represented more clearly in Figs. 24–29. Fig. 24 is a plan of the shaker. It has a toothed imperforate front portion $j$ followed by a screen portion $j'$ (forming the main part of the shaker) which in turn is followed by a "lip riddle" $j^2$, after which comes a grate $j^3$. The screen portion $j'$ is composed of a hard wood bottom fluted lengthwise as shown more clearly at $j^5$ in Figs. 25, 26, 27, with holes $j^6$ through the bottom, formed in the plates. The hulled beans roll into the flutes and are thus directed with more certainty to the holes through which they pass to the shaking shoe K below. This fluted screen arrangement may be employed also in the upper shaker if desired. Extending lengthwise of and secured to this screen portion $j'$ are serrated metal strips $j^7$ placed at suitable intervals apart and designed to give rearward impulse to the material on the screen. The construction of the lip riddle portion $j^2$ has already been described in connection with the upper shaker which contains a similar provision. The downwardly extending lips $j^8$ (Figs. 28, 29) slant in the direction of the fan M, and serve to direct the blast therefrom up through the holes in the riddle. The grate $j^3$ consists of wires extending lengthwise of the shaker. In practice they are about 5 inches long and ¾ of an inch apart. But of course these dimensions may be varied. There is a similar lip riddle in the shaking shoe K, indicated by dotted lines at $k$, Fig. 1$^a$. The purpose of all of these riddles and the grate, is to save the unthreshed portion of the material passing through the machine from being discharged along with the bulky trash, and to discharge it into the tailings spout L, whence it is returned to the machine by the tailings elevator L'.

The two shakers are supported in the machine and operated as follows: At the rear they are supported on each side by an arm N (shown in dotted lines in Fig. 1$^a$) pivoted at a point between its ends to the body of the machine, as indicated at 6, and having its lower end pivoted to the lower shaker as indicated at 7, and its upper end pivoted to the upper shaker, as indicated at 8. At the front they are connected on each side to a lever arm O (Fig. 1$^a$) pivoted at 9 to the frame of the machine, through the medium of a track plate P secured to the side of the machine, and trunnions 10 which extend respectively through the track slots $p$, $p'$ in the track plates and vertical slots $o$ $o'$ in the lever O. The track plate and the lever are shown on enlarged scale in Figs. 30, 31, 32, 33. The lever O is actuated from a crank shaft P', Fig. 1, through the medium of a connecting rod $r$, pivoted to the lower end of said lever. As the lever vibrates the trunnions 10 can rise and fall in the slots $o$ $o'$, as they move back and forth in the track slots $p$, $p'$. The lower track slot $p$ is horizontal, and consequently the movement of the lower shaker is substantially a reciprocatory movement. The upper track slot $p'$ inclines upwardly from front to rear, and therefore the upper screen has a tetering movement as well as a reciprocating movement—a distinct upward throw during its rearward movement.

The shaking shoe K is supported and operated in the usual way, and it contains the usual riddles $k'$ $k'$ (in any suitable number) to receive the beans from the upper shaker and deliver them free from chaff to the discharge spout $k^2$. In order to get rid of the sand and fine dirt which will not be blown out by the fan blast, I place in the lower part of the shoe and slightly above the bottom thereof, a "sand screen" $k^3$ (Fig. 1ª). The sand and small particles of dirt pass down into the inclosed space below this screen and are discharged through an opening $k^4$ in the bottom of the shoe. The structural details are represented more clearly in the enlarged views Figs. 34 and 35.

The beans in their passage through the several screens, shakers and riddles are, by the action of these instrumentalities and the fan blast, gradually freed from the refuse which is unavoidably mixed with them at first, so that by the time they reach the spout of the shaking shoe K they are practically clean.

Under the arrangement described, it will be noted that the charge from its entry into the carrier to its exit from the machine is subjected to a treatment which becomes more vigorous as the charge moves on—the least vigorous in the carrier under the action of the whipper-beater, becoming harsher at the first cylinder and concave, and the harshest treatment being reserved for the last cylinder and concave. It will also be noted that at practically all points from the entry to the exit of the charge, provision is made whereby the beans, as soon as hulled, are disassociated from the charge (consisting of vines, trash and unhulled beans) still under treatment and are all carried off, out of the path of the active threshing instrumentalities, to the screening instrumentalities, whence they pass to the shoe. The separation is thorough and complete, while at the same time the fragile product, which it is the object of the separating operation to obtain, is kept practically intact and uninjured—the percentage of loss from cracking or breaking being trifling.

The structural details hereinbefore described and shown in illustration of my invention are those which I believe to be best adapted to carry the invention into practical effect; but I desire it to be understood that the same can be varied considerably without departure from the spirit of my invention.

What therefore I claim and desire to secure by Letters Patent is—

1. In a machine for threshing and separating the garbanza bean and similar products, the combination substantially as hereinbefore set forth, with the threshing instrumentalities and the screening instrumentalities for receiving and cleaning the hulled beans, of a carrier for feeding the charge to be treated to said threshing instrumentalities, a whipper-beater mounted on said carrier and adapted to act upon the traveling charge, a screen in the bottom of the carrier beyond the point where the whipper-beater is located, and a conveyer to receive the beans which drop through the carrier screen, and convey the same directly to the screening instrumentalities.

2. In a machine for threshing and separating the garbanza bean and similar products, the combination substantially as hereinbefore set forth of a carrier for conveying to the machine the charge to be treated, a whipper-beater mounted on the carrier and adapted to act upon the traveling charge, a screen in the bottom of the carrier beyond the point where the whipper-beater is located, a vibratory screen chute over which the charge passes from the carrier, threshing instrumentalities for acting upon the charge and hulling the beans, screening instrumentalities for receiving and cleaning the hulled beans and a conveyer for receiving the beans which drop through the carrier screen and the vibratory screen chute, and for conveying the same directly to the screening instrumentalities.

3. In a machine of the character specified, having a plurality of cylinders and concaves to the action of which the charge is successively subjected, the combination of a carrier for conveying to the first cylinder and concave the charge to be treated; the whipper-beater mounted on the carrier and adapted to act upon the traveling charge; the screen in the bottom of the carrier beyond the point where the whipper-beater is located; the first cylinder and concave provided with cylindrical slightly tapering teeth, the second cylinder and concave provided with the usual flat teeth—each concave being composed of alternate screen and toothed sections; screening instrumentalities to receive the beans hulled by the action of said cylinders and concaves; and a conveyer to receive the beans and other products which drop through the carrier screen and convey the same directly to said screening instrumentalities, substantially as and for the purposes hereinbefore set forth.

4. In a machine of the character specified and in combination with the threshing and screening instrumentalities, a carrier for feeding the charge to the threshing instrumentalities, a power driven whipper-beater mounted on the carrier and adapted to act upon the charge as it travels along, and a screen in the bottom of the carrier beyond the point where the whipper-beater is located, through which the products separated out by the action of said whipper-beater may pass.

5. The combination of the carrier, the whipper-beater mounted thereon, the screen in the floor of the carrier beyond the point where the whipper-beater is located, the vibratory screen chute, over which the charge passes on leaving the carrier, the traveling by-pass apron located below the carrier screen and vibratory screen chute, to receive the products which drop through the same, and screening instrumentalities to which said products are conveyed by said by-pass apron.

In testimony whereof I affix my signature in presence of two witnesses.

HENRY WOLF EISENHART.

Witnesses:
LLOYD PERCIVAL MYERS,
LARNE S. GROSS.